R. F. CHATILLON.
SCALE PAN.
APPLICATION FILED MAY 6, 1915.

1,259,957.

Patented Mar. 19, 1918.

Witnesses:
Joseph D. Connelly Jr.
Arthur Allen Jr.

Inventor
Ralph F. Chatillon
By his Attorneys
Edwards, Sager & Wooster.

UNITED STATES PATENT OFFICE.

RALPH F. CHATILLON, OF SCARSDALE, NEW YORK, ASSIGNOR TO JOHN CHATILLON & SONS, A CORPORATION OF NEW YORK.

SCALE-PAN.

1,259,957.   Specification of Letters Patent.   Patented Mar. 19, 1918.

Application filed May 6, 1915. Serial No. 26,215.

*To all whom it may concern:*

Be it known that I, RALPH F. CHATILLON, a citizen of the United States, residing at Scarsdale, in the county of Westchester and State of New York, have invented certain new and useful Improvements in Scale-Pans, of which the following is a full, clear, and exact specification.

This invention relates to scale pans, and has particular reference to an improved means for separably connecting the bail and the pan so that they can be separated to enable the pan to be cleaned, and also for convenience in packing and shipment.

The invention is particularly intended for the pans of suspended spring scales, such as those used by butchers, which require to be kept in clean and sanitary condition and also to be of neat and attractive appearance. By this invention, the pan is readily separable from the bail, without using nuts or clamping screws, and at the same time objectionable corners or crevices in which dirt might lodge are avoided. Also, a scale is produced of attractive and ornamental appearance.

In the accompanying drawing.

Figure 1:
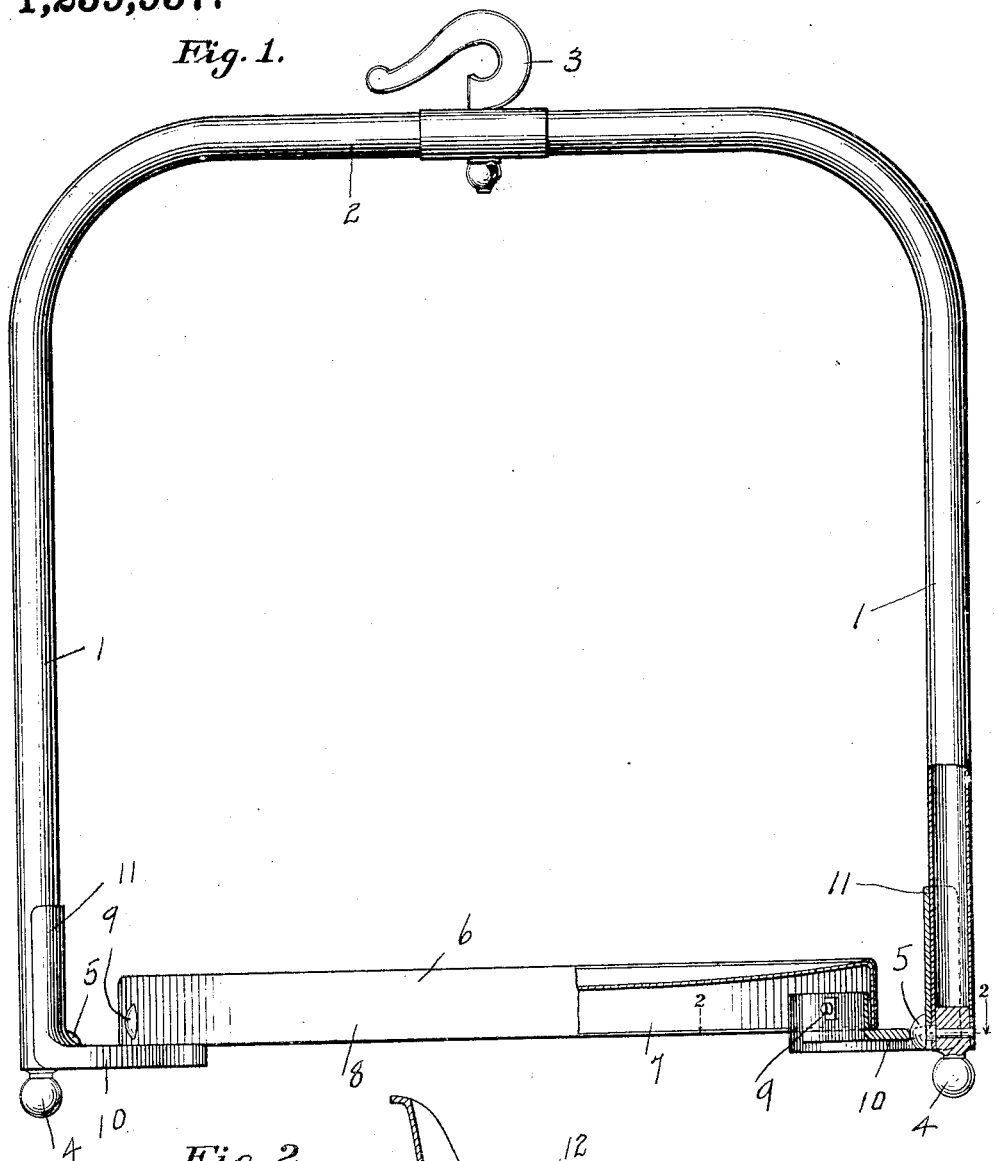
Figure 1 is an elevation of a scale embodying the invention.
Figure 2:
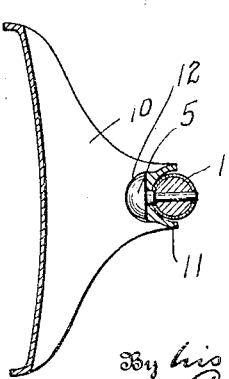
Fig. 2 is a section on the line 2—2 of Fig. 1.

1—1 represent vertical parallel sided legs of a bow 2 having a swiveled hook 3 which is connected to the runner of the scale. The legs 1 are somewhat resilient, and are provided at their lower ends with ornamental knobs 4 and also with headed supporting studs 5. 6 represents the pan, having its edge 7 inverted to form a rim 8, and fastened to the inside at 9 are supporting lugs 10. These lugs extend laterally below the rim, and carry upwardly projecting semi-circular extensions 11, which engage with and slide on the vertical legs 1. The lugs 10 are provided with slots 12 which receive the rounded heads of the studs 5. To disengage the pan, it is slid upwardly until the lugs 10 clear the studs 5, and then by spreading the legs 1, the pan is quickly detached. The pan is connected to the bow by a reverse operation. By reason of the offset lugs 10, it will be seen that the entire rim of the pan is free of projections and has a clearance between the bows. This permits the pan and rim to be easily wiped. Also the device is very sanitary because of the absence of crevices and projections on the pan or rim. It will, therefore, be seen that by this invention the pan is normally firmly attached to the bail without looseness or rattle, but that it can be quickly detached by sliding it upward and then spreading the legs. The semi-circular form of the extensions 11 facilitates this separation, but obviously the invention is not restricted to the precise details of construction herein shown.

Various modifications may be made without departing from the scope of the appended claims.

Having thus described my invention, I declare that what I claim as new and desire to secure by Letters Patent, is:—

1. The combination with an inverted bow having a stud projecting inwardly from each end, of a pan having lugs at its opposite sides adapted to rest on and be supported by said studs, said pan being separable from the bow by upward movement, and said lugs and studs being also slidably interlocked to prevent tilting of the pan relatively to the bow.

2. The combination with a bow having studs at its lower ends, of a pan mounted in said bow to slide into and out of supporting engagement with said studs.

3. The combination with a pan having a depending rim, of oppositely disposed lugs secured within the rim and projecting outwardly, and a bow slidably connected to said lugs.

4. The combination with a pan having a depending rim, of lugs attached to the interior of the rim and projecting laterally outside the rim, semicircular vertical extensions on said lugs, and a bow separably interlocking with said lug extensions.

5. The combination with a pan, of oppositely disposed lugs carried thereby, at least one of said lugs having a vertical channeled extension, and a bow carrying an inwardly projecting stud at each end adapted to engage and interlock with said lugs, said channeled extension engaging the bow to prevent tilting.

6. The combination with a pan, of oppositely disposed slotted lugs carried thereby, at least one of said lugs having a vertically channeled extension, and a bow carrying an inwardly projecting stud at each end adapted to engage and interlock with the slots in said lugs, said channeled extension engaging the bow to prevent tilting.

In testimony whereof I affix my signature, in presence of two witnesses.

R. F. CHATILLON.

Witnesses:
FREDERICK M. STEVENS,
FRED S. WINTERS.